United States Patent [19]
Beck

[11] Patent Number: 5,821,850
[45] Date of Patent: Oct. 13, 1998

[54] METHOD AND APPARATUS FOR COMPARING MAGNITUDE OF DATA FROM A PLURALITY OF DATA SOURCES

[75] Inventor: John Andrew Beck, Austin, Tex.

[73] Assignee: International Business Machines Corporation, Armonk, N.Y.

[21] Appl. No.: 710,441

[22] Filed: Sep. 17, 1996

[51] Int. Cl.$^6$ ..................................................... G05B 1/00
[52] U.S. Cl. ............................................................. 340/146.2
[58] Field of Search ........................................... 340/146.2

[56] References Cited

U.S. PATENT DOCUMENTS 5,592,142  1/1997  Adams et al. ......................... 340/146.2

*Primary Examiner*—Margaret Rose Wamback
*Attorney, Agent, or Firm*—Anthony V.S. England

[57] ABSTRACT

An information handling system includes a data comparison circuit which includes a number of multi-bit comparison circuit modules, wherein each of the multi-bit comparison circuit modules includes a circuit for comparing two or more bits from a first data source with two or more bits from a second data source to produce an output indicating that the data bits from the first data source are equal to the data bits from the second data source; one or more AND gates for ANDing output signals from each of the first set of circuit modules to produce an output signal if all bits in the first data source are equal to all bits in a second data source; one or more second circuit modules for providing an output signal indicating that data bits from the first data source are unequal to corresponding data bits from the second data source; and one or more inequality combination circuits combining inequality signals from each of the second set of circuit modules to produce an output when value of data from the first data source is unequal to the value of data from the second data source. The unequal compare may typically produce a signal indicating that the selected data bits from the first data source are greater than the corresponding data bits from the second data source. Alternatively, the unequal compare can be used to indicate a less than compare condition.

15 Claims, 5 Drawing Sheets

METHOD AND APPARATUS FOR COMPARING MAGNITUDE OF DATA FROM A PLURALITY OF DATA SOURCES

BACKGROUND OF THE INVENTION

1. Technical Field of the Invention

The present invention relates to information handling systems and, more particularly, to information handling systems including method and apparatus for comparing magnitude of data values from a plurality of data sources.

2. Prior Art

In many situations in information handling systems, it is necessary to compare the magnitude of data from two or more data sources such as data stored in registers or data presented on buses.

In most prior art systems, data magnitude comparison is implemented using adder circuits. With magnitude comparison of data values, there generally can be one of three results. A first data value may be either less than, equal to, or greater than one or more other data values being compared.

It is desirable to achieve a data magnitude comparison in an efficient manner using minimum number of cycles with the smallest amount of logic to achieve the desired result.

SUMMARY OF THE INVENTION

Accordingly, an information handling system includes a data comparison circuit which includes a number of multi-bit comparison circuit modules, wherein each of the multi-bit comparison circuit modules includes a circuit for comparing two or more bits from a first data source with two or more bits from a second data source to produce an output indicating that the data bits from the first data source are equal to the data bits from the second data source; one or more AND gates for ANDing output signals from each of the first set of circuit modules to produce an output signal if all bits in the first data source are equal to all bits in a second data source; one or more second circuit modules for providing an output signal indicating that data bits from the first data source are unequal to corresponding data bits from the second data source; and one or more inequality combination circuits combining inequality signals from each of the second set of circuit modules to produce an output when value of data from the first data source is unequal to the value of data from the second data source.

The unequal compare may typically produce a signal indicating that the selected data bits from the first data source are greater than the corresponding data bits from the second data source. Alternatively, the unequal compare can be used to indicate a less than compare condition.

It is an advantage of the present invention that data from two data sources may be efficiently compared with a relatively simple modular comparison circuit structure.

DETAILED DESCRIPTION OF A PREFERRED EMBODIMENT OF THE INVENTION

Figure 1:
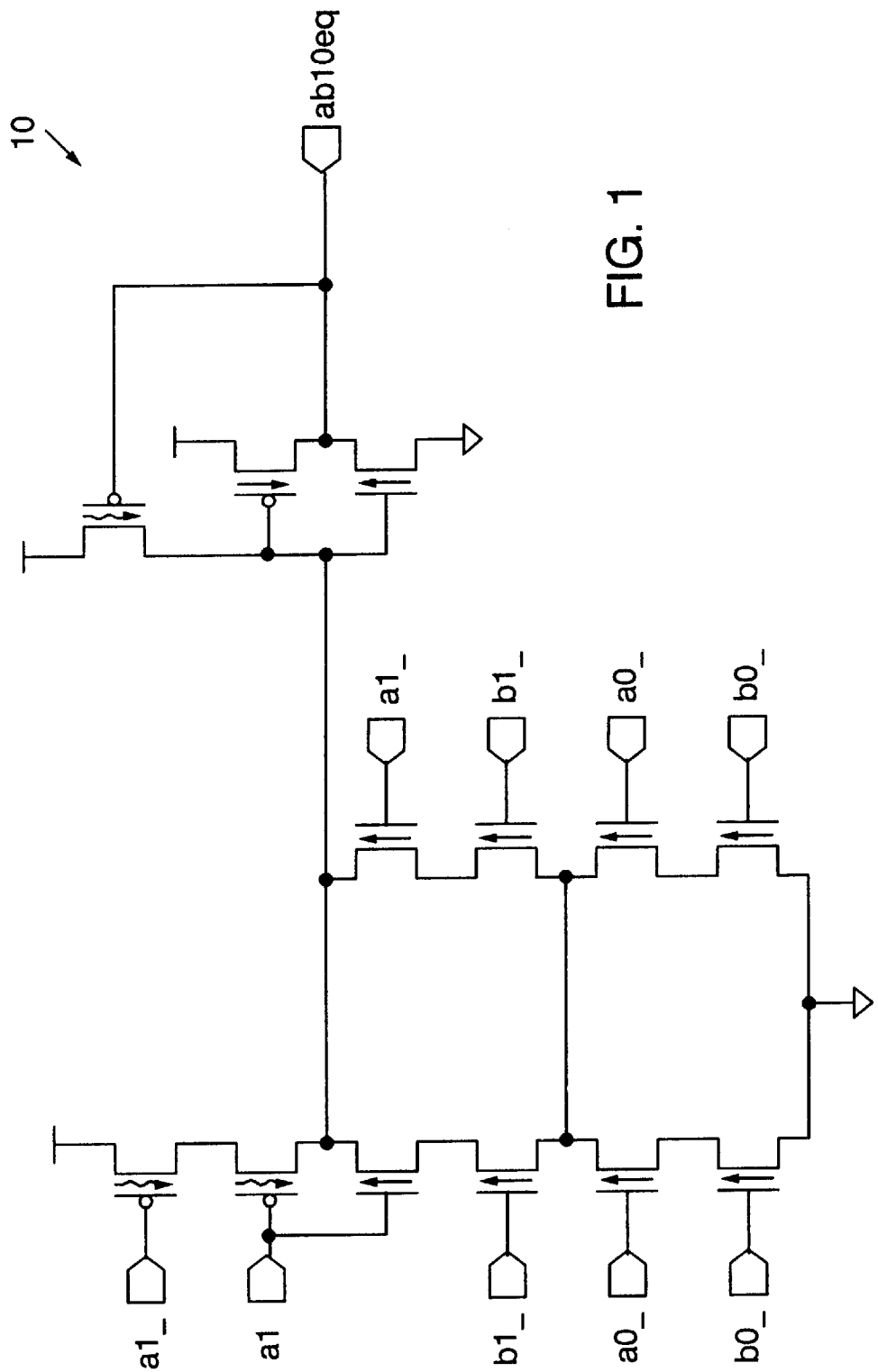
FIG. 1 is a circuit module for a two bit EQUAL compare in accordance with the present invention.
Figure 2:
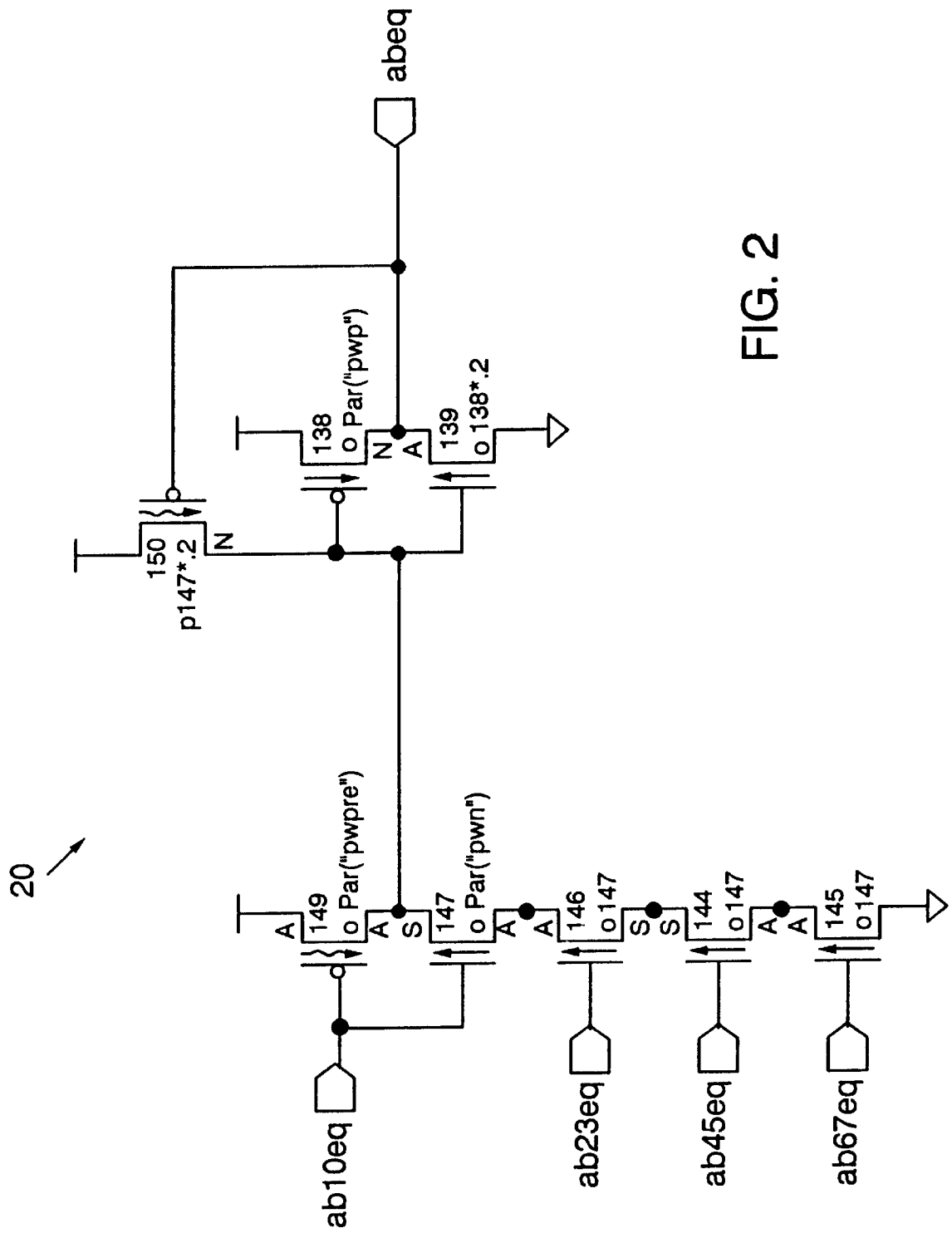
FIG. 2 is a combining circuit combining the outputs of a number of two bit EQUAL compare circuits shown in FIG. 1.
Figure 3:
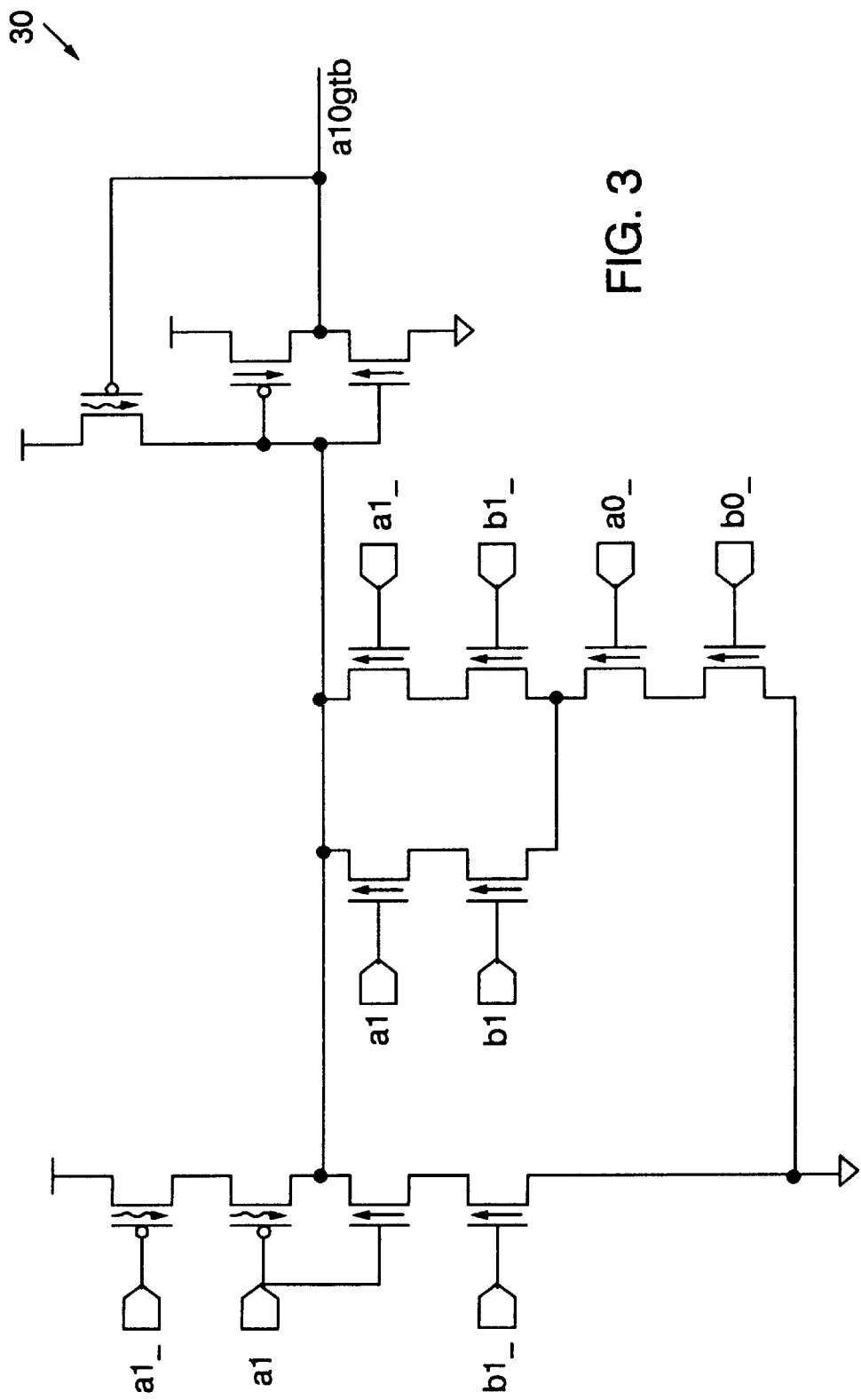
FIG. 3 is a circuit module for performing a an unequal compare on two bits of two different data sources.
Figure 4:
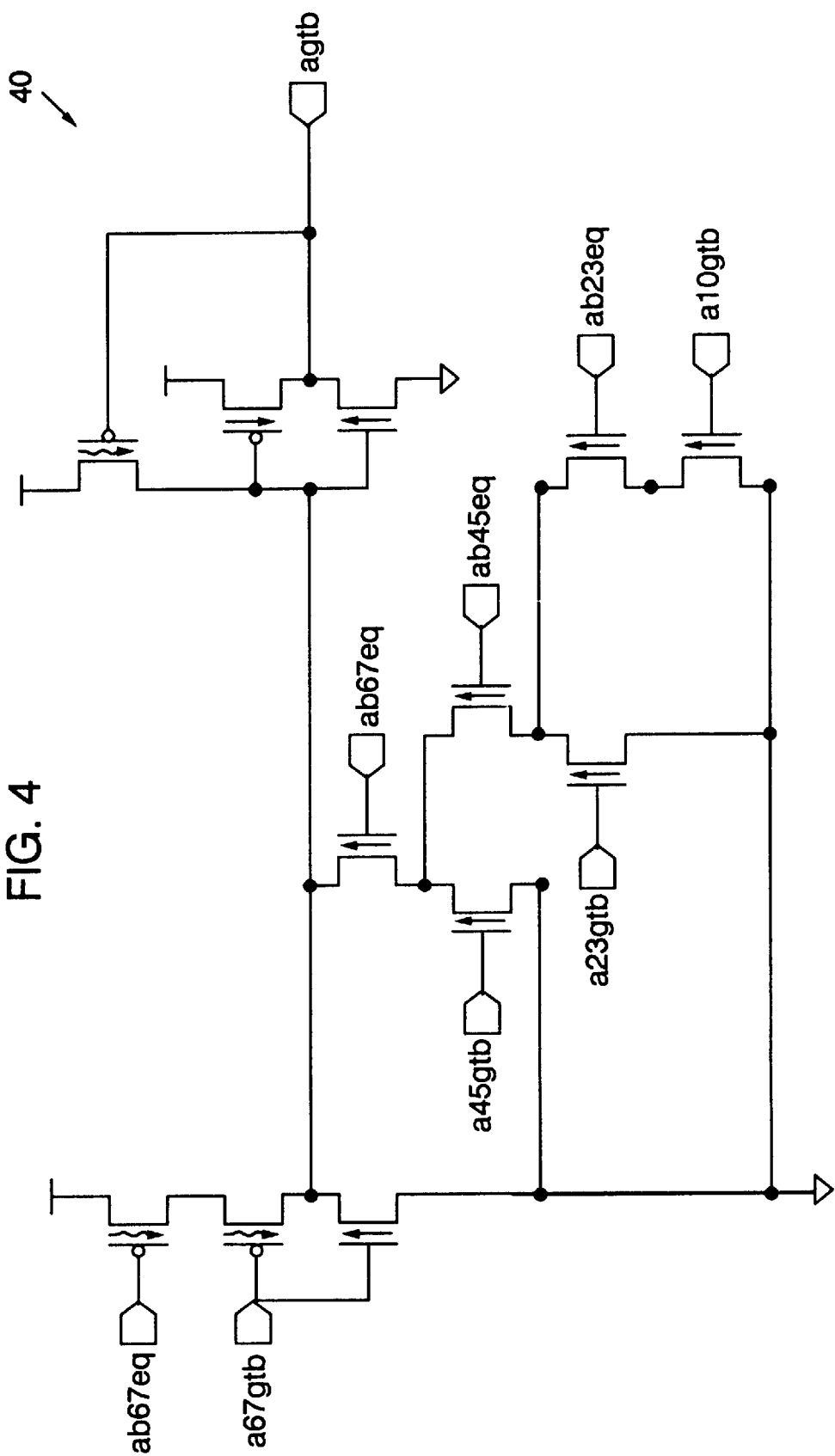
FIG. 4 is a circuit diagram of a combining circuit for combining outputs of the unequal compare circuits of FIG. 3.

A comparison circuit according to the present invention includes one or more two bit EQUAL compare circuits such as shown in FIG. 1, a combining circuit such as shown in FIG. 2, one or more of the two bit inequality compare circuits such as shown in FIG. 3, and an inequality combination circuit such as shown in FIG. 4.

In a compare operation according to the present invention, assuming an eight bit byte from each data source to be compared, wherein bit 0 of each byte is considered to be the most significant bit and bit 7 is considered to be the least significant bit, bits 0 and 1 of the first data source a are compared to bits 0 and 1 of a second data source b in the EQUAL compare circuit 10 of FIG. 1 and in the inequality compare circuit 30 of FIG. 3.

Similar two bit compare circuits would be used to compare bits 2 and 3, bits 4 and 5 and bits 6 and 7, respectively of data sources a and b. Thus for a typical eight bit byte, the circuit of FIGS. 1 and 3 would be replicated so that there would be four of the equal compare circuit modules and four of the inequality compare circuit modules of FIG. 3 to perform the EQUAL compare and the inequality compare, respectively, on the entire bytes from sources a and b.

As can be seen from FIG. 1, the inputs required for the EQUAL compare are the true and complement value for bits a0, a1, from data source a and b0 and b1 from data source b. The EQUAL compare appears on the output labeled ab01eq. The EQUAL output of the two bit compare circuit of FIG. 1 is connected to an input of the EQUAL combination circuit 20 shown in FIG. 2 which is an AND circuit. Since the EQUAL compare for an eight bit byte requires four of the circuit modules 10 of FIG. 1, there are four inputs to the AND circuit of FIG. 2, namely ab01eq, ab23eq, ab45eq and ab67eq. The output from the AND circuit shown in FIG. 2 is a signal labeled abeq indicating that if that output is true than the value of the byte from data source a are equal to the byte from data source b.

Referring now to FIGS. 3 and 4, the inequality comparison will be described. FIG. 3 shows a two bit compare circuit 30 which performs the compare between two bits from data source a and two bits from data source b. In circuit 30, bits 0 and 1 are being compared. It should be understood that for typical eight bit byte, there would be three additional circuit modules 30 which would perform the compare on bits 2 and 3, 4 and 5, and 6 and 7 of the bytes from data sources a and b, respectively. As can be seen from circuit module 30 of FIG. 3, for a GREATER THAN compare function, the true and complement values of the two bits from each data source are required. The output of circuit module 30 is labeled a01gtb. This output notation means that bits 0 and 1 of data source a are greater than bits 0 and 1 of data source b. Although the example has been given of an a greater than b compare, a b greater than a compare could easily be obtained by reversing inputs.

Referring now to FIG. 4, circuit module 40 which combines the outputs of one or more circuit modules 30 to achieve a determination of whether the byte from data source a is greater than the byte from data source b will be described.

Circuit 40 is an AND/OR circuit in which the logic is essentially as follows:

If a01 is greater than b01, then the byte from data source a is greater than the byte from data source b, the output a01gtb indicating that the most significant bits show a greater than function of a over b. This condition provides a GREATER THAN output at agtb regardless of the condition of any of the other input signals to AND/OR circuit 40. From the circuit 40, it can be seen that regardless of the condition of the comparison of bits 2 and 3 of bytes a and b, respectively, if bytes 0 and 1 indicate an inequality of a GREATER THAN b, this will cause the output of circuit 40 to indicate a true condition of a GREATER THAN b.

If on the other hand, a01 is equal to b01, the next test is whether bits 2 and 3 of byte a are greater than bits 2 and 3 of byte b. It can be seen if the signal a23gtb is true, the same output results as indicated above. Similarly, moving down to compare of bits 4 and 5, or bits 6 and 7 of the respective bytes a and b, it can be seen that if all higher order bits in a byte are equal, if a pair of bits in byte a is determined to be of greater value than the corresponding pair of bits in byte b, the output of circuit 40 indicates a condition of a GREATER THAN b.

If, of course, the value of byte a is equal to the value of byte b, the output of circuit 40 is false but the output of circuit 20 is true, indicating the equality of the value of the two bytes a and b.

The preferred embodiment of the present invention has been described with circuits which determine that selected bits of byte a are greater than corresponding selected bits of byte b. It should be understood that those skilled in the art could easily and without further invention employ circuits which determine that selected bits of byte a are less than the corresponding selected bits of byte b to perform the comparison in accordance with the present invention.

Figure 5:
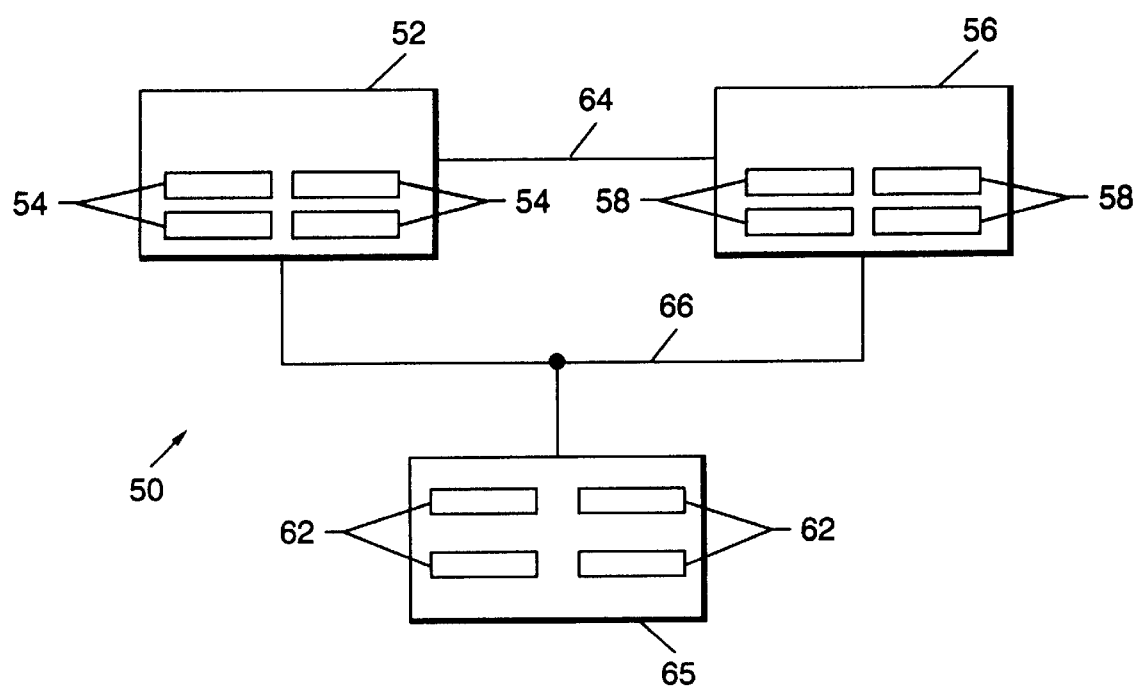
FIG. 5 is a block diagram of an information handling system embodying the present invention.

Referring now to FIG. 5, an information handling system 50, embodying the present invention will be described.

System 50 includes at least one processor 52 which includes, among other elements a number of data registers for temporary storage of data being processed, a storage system 56 which includes, in addition to an array of storage elements, a number of registers 58 for storing data input to or output from the storage array, an input/output (I/O) subsystem 60 for communicating between processor 52, storage system 56 and peripheral devices and system users. Processor 52 communicates with storage system 56 by storage bus 64 and with I/O subsystem 60 by system bus 66. Compare circuits as discussed above with reference to FIGS. 1–4, may be included in processor 52, storage system 56 and I/O subsystem 60 for comparison of data values between any combination of registers 54, 58 or 62.

Although the invention has been described with respect to a preferred embodiment thereof specifically referring to a single eight bit byte, the invention could easily be expanded to any data width including a plurality of bytes being compared in parallel.

Although the present invention and its advantages have been described in detail, it should be understood that various changes, substitutions and alterations can be made herein without departing from the spirit or scope of the invention as defined in the appended claims.

What is claimed is:

1. An information handling system, comprising:
 a processor;
 a storage system, connected by a first bus to the processor;
 an input/output subsystem, connected to the processor and to the storage subsystem;
 wherein the processor, the storage system and the input/output subsystem each further comprise a plurality of registers; and compare means for comparing data from a plurality of sources in the information handling system to determine a parameter indicating a relationship between data bytes from the plurality of data sources, the compare means comprising:
 one or more first compare circuits, each first compare circuit for comparing a predetermined two bits from a first data source with a corresponding two bits from a second data source using as inputs the true and complement values of each bit and producing a first output signal if a value of the predetermined two bits from the first data source is equal to a value of the corresponding two bits from the second data source; and
 one or more second compare circuits, each second compare circuit for comparing the predetermined two bits from the first data source with the corresponding two bits from the second data source using as inputs the true complement values of each bit and producing a second output signal if the value of the predetermined two bits from the first data source has a predetermined inequality relationship to the value of the corresponding two bits from the second data source.

2. An information handling system, according to claim 1, wherein the compare means further comprises:
 a first combining circuit for combining using an AND circuit outputs from the first compare circuits to produce an output signal when an equality is determined between a data value from the first data source and a data value from the second data source.

3. An information handling system, according to claim 1, wherein the compare means further comprises:
 a second combining circuit for combining using AND/OR circuit outputs from the second compare circuits to produce an output signal when a predetermined inequality is determined between a data value from the first data source and a data value from the second data source.

4. An information handling system, according to claim 3, wherein the predetermined inequality is that the data value from the first data source is greater than the data value from the second data source.

5. An information handling system, according to claim 3, wherein the predetermined inequality is that the data value from the first data source is less than the data value from the second data source.

6. A data compare circuit, comprising:
 one or more first compare circuits, each first compare circuit for comparing a predetermined two bits from a first data source with a corresponding two bits from a second data source using as inputs the true and complement values of each bit and producing a first output signal if a value of the predetermined two bits from the first data source is equal to a value of the corresponding two bits from the second data source; and
 one or more second compare circuits, each second compare circuit for comparing the predetermined two bits from the first data source with the corresponding two bits from the second data source using as inputs the true and complement values of each bit and producing a second output signal if the value of the predetermined two bits from the first data source has a predetermined inequality relationship to the value of the corresponding two bits from the second data source.

7. An information handling system, according to claim 6, wherein the compare circuit further comprises:

a first combining circuit for combining using an AND circuit outputs from the first compare circuits to produce an output signal when an equality is determined between a data value from the first data source and a data value from the second data source.

8. An information handling system, according to claim 6, wherein the compare circuit further comprises:

a second combining circuit for combining using an AND/OR circuit outputs from the second compare circuits to produce an output signal when a predetermined inequality is determined between a date value from the first data source and a data value from the second data source.

9. A method for determining inequality between a value of a first data element and a value of a second data element, comprising the steps of:

comparing a first two data bits, having a first significance value, from the first data element with a corresponding two data bits, having the first significance value, from the second data element to determine an inequality relationship between the first two data bits from the first data element and the corresponding two data bits from the second data element;

repeating the comparing step for a further two data bits, of each of the first and second data elements, having other significance values, until all data bits in the first data element have been compared with all corresponding data bits in the second data element; and combining the inequality relationship signals from the comparing and repeating steps to produce a signal representing a combined inequality relationship between the first data element and the second data element.

10. A method, according to claim 9, wherein the inequality relationship is that the two data bits from the first data element is greater than the two data bits from the second data element.

11. A method, according to claim 9, wherein the inequality relationship is that the two data bits from the first data element is less than the two data bits from the second data element.

12. A method, according to claim 9, wherein the inequality relationship is that the two data bits from the first data element is equal to the two data bits from the second data element.

13. A method according to claim 9, wherein the combined inequality relationship is that the first data element is greater than the second data element.

14. A method, according to claim 9, wherein the combined inequality relationship is that the first data element is less than the second data element.

15. A method, according to claim 9, wherein the combined inequality relationship is that the first data element is equal to the second data element.

* * * * *